(12) United States Patent
Arulraj et al.

(10) Patent No.: US 9,987,619 B2
(45) Date of Patent: Jun. 5, 2018

(54) SELECTIVE CATALYTIC REDUCTION WALL FLOW FILTER INCORPORATING A VANADATE

(71) Applicant: Johnson Matthey Public Limited Company, London (GB)

(72) Inventors: Kaneshalingam Arulraj, Royston (GB); Ralf Dotzel, Nuremberg (DE); Rainer Leppelt, Michelau (DE); Jorg Werner Muench, Lichtenfels (DE); Alexandra Tsami Goodwin, Royston (GB); Gudmund Smedler, Bleket (SE)

(73) Assignee: Johnson Matthey Public Limited Company, London (GB)

( * ) Notice: Subject to any disclaimer, the term of this patent is extended or adjusted under 35 U.S.C. 154(b) by 0 days. days.

(21) Appl. No.: 14/404,763

(22) PCT Filed: May 31, 2013

(86) PCT No.: PCT/IB2013/001133
§ 371 (c)(1),
(2) Date: Dec. 1, 2014

(87) PCT Pub. No.: WO2013/179129
PCT Pub. Date: Dec. 5, 2013

(65) Prior Publication Data
US 2015/0190787 A1 Jul. 9, 2015

Related U.S. Application Data

(60) Provisional application No. 61/654,424, filed on Jun. 1, 2012.

(51) Int. Cl.
*B01J 23/847* (2006.01)
*B01D 53/94* (2006.01)
(Continued)

(52) U.S. Cl.
CPC ...... *B01J 23/8472* (2013.01); *B01D 53/9418* (2013.01); *B01D 53/9431* (2013.01);
(Continued)

(58) Field of Classification Search
None
See application file for complete search history.

(56) References Cited

U.S. PATENT DOCUMENTS 3,223,653 A * 12/1965 Stiles ............... B01D 53/86
423/213.2
4,902,487 A 2/1990 Copper et al.
(Continued)

FOREIGN PATENT DOCUMENTS

CN 101972652 A 2/2011
CN 102284281 B 6/2014
(Continued)

OTHER PUBLICATIONS

Chinajinti. Ceramic Honeycomb Substrate. Diesel Particulate Filter. Ceramic Honeycombs. Jiangxi Jintai Special Material LLC. 2005. http://www.ceramic-honeycombs.com/ceramic/Diesel_Particulate_Filter.htm.*
(Continued)

*Primary Examiner* — Walter D. Griffin
*Assistant Examiner* — Jelitza M Perez

(57) ABSTRACT

A filter incorporates a catalyst for the Selective Catalytic Reduction (SCR) of $NO_x$ gases and removal of particulate matter from the exhaust gas of a lean burn combustion engine, wherein the catalyst includes a vanadate component having an alkaline earth metal, a transition metal, a rare earth metal, or combinations thereof. The vanadate component may be iron vanadate. The filter includes a supported vanadate component disposed on a wall-flow filter. The method of making the filter includes applying an aqueous
(Continued)

mixture of the supported vanadate component as a washcoat on the wall-flow filter or extruding a composition containing the supported vanadate component. The method of treating exhaust gases from an engine includes contacting the exhaust gas with the catalyst including the vanadate component.

11 Claims, 1 Drawing Sheet

(51) Int. Cl.
| | |
|---|---|
| B01J 37/04 | (2006.01) |
| B01J 37/08 | (2006.01) |
| B01J 35/04 | (2006.01) |
| B01J 37/00 | (2006.01) |
| B01J 37/02 | (2006.01) |
| B01J 21/06 | (2006.01) |
| B01J 21/08 | (2006.01) |
| B01J 21/16 | (2006.01) |
| B01J 23/30 | (2006.01) |
| B01J 27/24 | (2006.01) |
| B01J 35/00 | (2006.01) |
| B01J 23/00 | (2006.01) |
| F01N 3/20 | (2006.01) |
| F01N 3/035 | (2006.01) |

(52) U.S. Cl.
CPC ............. *B01J 21/063* (2013.01); *B01J 21/08* (2013.01); *B01J 21/16* (2013.01); *B01J 23/30* (2013.01); *B01J 27/24* (2013.01); *B01J 35/04* (2013.01); *B01J 37/0009* (2013.01); *B01J 37/0215* (2013.01); *B01J 37/04* (2013.01); *B01J 37/08* (2013.01); *B01D 2255/206* (2013.01); *B01D 2255/209* (2013.01); *B01D 2255/2042* (2013.01); *B01D 2255/2045* (2013.01); *B01D 2255/2047* (2013.01); *B01D 2255/2068* (2013.01); *B01D 2255/2092* (2013.01); *B01D 2255/2096* (2013.01); *B01D 2255/20707* (2013.01); *B01D 2255/20723* (2013.01); *B01D 2255/20738* (2013.01); *B01D 2255/20761* (2013.01); *B01D 2255/20776* (2013.01); *B01D 2255/20792* (2013.01); *B01D 2255/30* (2013.01); *B01D 2255/9155* (2013.01); *B01D 2257/406* (2013.01); *B01J 23/002* (2013.01); *B01J 35/0006* (2013.01); *F01N 3/035* (2013.01); *F01N 3/2066* (2013.01); *F01N 2330/06* (2013.01); *Y02T 10/24* (2013.01)

(56) References Cited

U.S. PATENT DOCUMENTS

| | | | |
|---|---|---|---|
| 6,380,128 B1 | 4/2002 | Ji et al. | |
| 6,599,570 B1 | 7/2003 | Aderhold et al. | |
| 7,908,845 B2* | 3/2011 | Brown | B01F 3/04049 366/337 |
| 8,101,146 B2 | 1/2012 | Fedeyko et al. | |
| 2004/0116285 A1 | 6/2004 | Huang et al. | |
| 2010/0242424 A1 | 9/2010 | Harada et al. | |
| 2011/0150731 A1* | 6/2011 | Schermanz | B01D 53/9418 423/239.1 |
| 2011/0268624 A1 | 11/2011 | Chandler et al. | |
| 2014/0093442 A1* | 4/2014 | Spreitzer | B01D 53/944 423/239.1 |

FOREIGN PATENT DOCUMENTS

| | | | | |
|---|---|---|---|---|
| JP | 2009165922 A | 7/2009 | | |
| JP | 2010038019 A | 2/2010 | | |
| WO | 200003790 A1 | 1/2000 | | |
| WO | 2010121280 A1 | 10/2010 | | |
| WO | WO 2010121280 A1 * | 10/2010 | ........ | B01D 53/9418 |
| WO | 2011127505 A1 | 10/2011 | | |

OTHER PUBLICATIONS

Jessup. What is Impregnation?. Jessup Adhesive Coated Films. Unknown Date. http://www.jessupmfg.com/coating-services/what-is-the-difference-between-coating-and-impregnation/.*
Majewski, W. Wall-Flow Monoliths. Diesel Filter Materials. DieselNet Technology Guide. 2005 pp. 1-3 https://www.dieselnet.com/tech/dpf_wall-flow.php.*

* cited by examiner

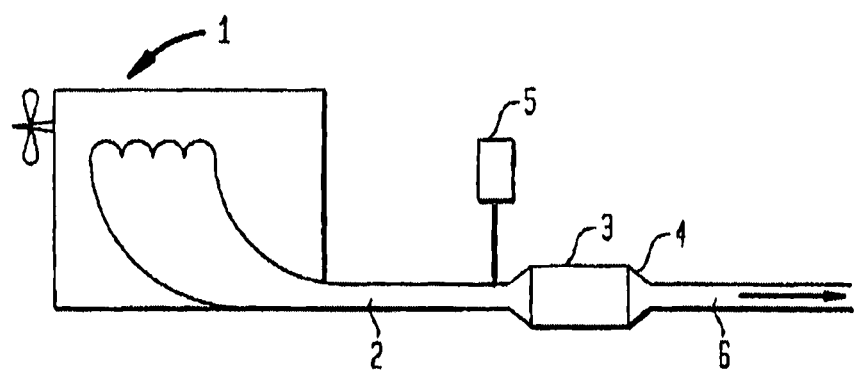

SELECTIVE CATALYTIC REDUCTION WALL FLOW FILTER INCORPORATING A VANADATE

CROSS-REFERENCE TO RELATED APPLICATIONS

This application is the U.S. National Phase application of PCT International Application No. PCT/IB2013/001133, filed on May 31, 2013, and claims priority benefit to U.S. Provisional Application No. 61/654,424 filed on Jun. 1, 2012, the disclosures of each of which are incorporated herein by reference.

FIELD OF THE INVENTION

The present invention relates to a filter in which a catalyst is incorporated for selective catalytic reduction of exhaust gases. Such a filter may be used for the removal of $NO_X$ and particulate matter, particularly in exhaust gas from lean burn combustion engines.

BACKGROUND OF THE INVENTION

Exhaust gas produced by on-road vehicles in the United States currently contributes about a third of the country's smog-producing air pollution. Efforts to reduce smog include the use of more fuel efficient engines, such as diesel engines compared to gasoline engines, and improved exhaust gas treatment systems.

The largest portions of most combustion exhaust gases contain nitrogen ($N_2$), water vapor ($H_2O$), and carbon dioxide ($CO_2$), but the exhaust gas also contains in relatively small part noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). One of the most burdensome components of vehicular exhaust gas is $NO_X$, which includes nitric oxide (NO), nitrogen dioxide ($NO_2$), and nitrous oxide ($N_2O$). The production of $NO_X$ is particularly problematic for lean burn engines, such as diesel engines. To mitigate the environmental impact of $NO_X$ in exhaust gas, it is desirable to eliminate these undesirable components, preferably by a process that does not generate other noxious or toxic substances.

The exhaust gas of diesel engines tends to have more soot compared to gasoline engines. Soot emissions can be remedied by passing the soot-containing exhaust gas through a particulate filter. However, the accumulation of soot particles on the filter can cause an undesirable increase in the back pressure of the exhaust system during operation, thereby decreasing efficiency. To regenerate the filter, the accumulated carbon-based soot must be removed from the filter, for example by periodically combusting the soot by passive or active oxidation at high temperatures.

For lean burn exhaust gas, such as diesel exhaust gas, reducing reactions are generally difficult to achieve. However, one method for converting $NO_X$ in a diesel exhaust gas into more benign substances is commonly referred to as Selective Catalytic Reduction (SCR). An SCR process involves the conversion of $NO_X$, in the presence of a catalyst and with the aid of a reducing agent, into elemental nitrogen ($N_2$) and water. In an SCR process, a gaseous reductant, typically anhydrous ammonia, aqueous ammonia, or urea, is added to an exhaust gas stream prior to contacting the catalyst. The reductant is absorbed onto a catalyst and the $NO_X$ reduction reaction takes place as the gases pass through or over the catalyzed substrate. The chemical equation for a stoichiometric reaction using ammonia for an SCR process is:

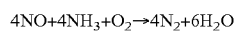
$$4NO+4NH_3+O_2 \rightarrow 4N_2+6H_2O$$

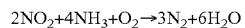
$$2NO_2+4NH_3+O_2 \rightarrow 3N_2+6H_2O$$

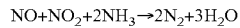
$$NO+NO_2+2NH_3 \rightarrow 2N_2+3H_2O$$

Original catalysts utilized in the selective catalytic reduction of $NO_X$ using $NH_3$ as the reducing agent included metals, such as platinum or platinum group metals. Current SCR catalyst technology and research is focused on vanadium catalysts supported on titanium and tungsten (V—Ti—W) and has exhibited some success.

Since SCR catalysts generally serve as heterogeneous catalysts (i.e., solid catalyst in contact with a gas and/or liquid reactant), the catalysts are usually supported by a substrate. Preferred substrates for use in mobile applications include flow-through monoliths having a so-called honeycomb geometry that comprises multiple adjacent, parallel channels that are open on both ends and generally extend from the inlet face to the outlet face of the substrate. Each channel typically has a square, round, hexagonal, or triangular cross-sectional. Catalytic material is applied to the substrate typically as a washcoat that can be embodied on and/or in the walls of the substrate.

Many catalysts incorporating vanadates, relative to certain other SCR catalysts, do not efficiently convert NOx at operating temperatures below 300° C. Many known catalysts incorporating vanadates also lose activity upon prolonged exposure to temperatures above 600° C., which is the operating temperature for filter regeneration. Therefore, there is a need to develop an improved exhaust gas treatment system which can utilize a vanadate.

SUMMARY OF THE INVENTION

An embodiment of the present invention includes a vanadate based catalytic material well suited for the application of an SCR wall-flow filter. The vanadate component incorporated in the present invention is capable of efficiently converting $NO_X$ at operating temperatures below 300° C. and withstand loss of activity after prolonged exposure to temperatures above 600° C. Because SCR wall-flow filters are operated under these temperature conditions, the catalytic material may be incorporated into an SCR wall-flow filter.

The catalytic component includes a vanadate component comprising an alkaline earth metal, a transition metal, a rare earth metal, or combinations thereof. The incorporation of the metal or combinations of metals in addition to the process of calcining the catalyst has been found to contribute to the improved stability of the activity of the catalyst upon prolonged exposure to temperatures above 600° C.

Accordingly, one aspect of the invention provides an SCR wall-flow filter, wherein a catalyst comprising a vanadate component having an alkaline earth metal, a transition metal, a rare earth metal, or combinations thereof is disposed on a substrate. "Catalyst" as used herein refers to a composition that includes a support, a metal containing compound carried by the support and may optionally include additional materials, such as binders and promoters. "Disposed on" as used herein means incorporated either on the surface of a substrate, within the substrate material, or, if the substrate is porous, on the surface of the substrate pores.

Another aspect of the invention provides a process of making the filter. The method of making the filter includes either incorporating the catalytic material into an aqueous mixture and applying it to a wall-flow filter or extruding a composition incorporating the catalytic material into the form of a wall-flow filter.

According to yet another aspect of the invention, provided is a method for treating an exhaust gas stream from a lean burn combustion engine, such as a diesel engine exhaust gas stream, containing $NO_X$ gases and particulate matter. The method includes conducting the exhaust gas stream through an SCR wall-flow filter incorporating a vanadate component having at least one of an alkaline earth metal, a transition metal, a rare earth metal, or combinations thereof for a time and temperature sufficient to reduce the level of $NO_X$ gases and particulate matter in the exhaust gas stream.

According to yet another aspect of the invention, provided is an engine exhaust gas treatment system comprising a filter made according to the inventive method as described herein; a conduit to carry an exhaust gas stream from a lean burn combustion engine to the filter, and a source of ammonia or urea upstream of the filter.

BRIEF DESCRIPTION OF THE DRAWING

In order that the invention may be more fully understood, the following Example is provided by way of illustration only and with reference to the accompanying drawing, in which:

FIG. 1 is a schematic representation of one embodiment of an engine exhaust gas treatment system including a filter according to the present invention.

DETAILED DESCRIPTION OF THE INVENTION

This invention provides a novel method of preparing a filter incorporating a vanadate component having an alkaline earth metal, a transition metal, a rare earth metal, or combinations thereof. The filter is capable of simultaneous selective catalytic reduction of $NO_X$ gases and removal of particulate matter from the exhaust gas stream of a lean burn combustion engine.

The vanadate component used in the present inventive filter may be expressed with the following general formula:

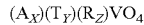

wherein "A" is an alkaline earth metal and "X" is the molar ratio of alkaline earth metal to vanadate ($VO_4$);
"T" is a transition metal and "Y" is the molar ratio of transition metal to vanadate ($VO_4$);
"R" is a rare earth metal and "Z" is the molar ratio of rare earth metal to vanadate ($VO_4$); and
$0 \leq X \leq 1$; $0 \leq Y \leq 1$; $0 \leq Z \leq 1$; and $X+Y+Z=1$.

For the purpose of the present specification and claims, the term "alkaline earth metal" means at least one of the elements of group II on the periodic table and "transition metal" means at least one of the elements of groups IV-XI on the periodic table and Zn.

In a preferred embodiment of the present invention, the alkaline earth metal is selected from the group consisting of Mg, Ca, Sr, and Ba, and the transition metal is selected from the group consisting of Fe, Bi, Al, Ga, In, Cu, Zn, Mo, Cr, Sb and Mn. In a particularly preferred embodiment of the present invention, the transition metal is Fe.

For the purpose of the present specification and claims, the term "rare earth" means at least one rare earth element.

According to IUPAC, rare earth elements include Sc, Y, and the fifteen Lanthanides, La, Ce, Pr, Nd, Pm, Sm, Eu, Gd, Tb, Dy, Ho, Er, Tm, Yb, and Lu. In a preferred embodiment of the present invention, the rare earth metal is Er.

Suitable vanadate components that may be used in the current inventive method of producing a filter capable of NOx reduction and removal of particulate matter from the exhaust gas of a lean burn combustion engine are disclosed in U.S. Published Patent Application No. 2011/150731, the contents of which are incorporated herein by reference in their entirety.

When preparing the filter according to the present invention, the vanadate component is combined with a support, which may be in the form of a powder. In a preferred embodiment, the support is $TiO_2$. In a particularly preferred embodiment, the vanadate component is combined with a support comprising a combination of $TiO_2$ and $WO_3$. In a more particularly preferred embodiment, the support comprises a combination of $TiO_2$, $WO_3$, and $SiO_2$. The weight ratio of $TiO_2$ to $WO_3$ combined in the support material is preferably 4:1 to 99:1, more preferably about 5:1 to 33:1, and most preferably about 7:1 to 19:1. The concentration of $SiO_2$ within the support is preferably optimized as higher concentrations of $SiO_2$ adversely affect the activity potential of the catalyst while insufficient amounts of $SiO_2$ negatively affects the stability of support.

In an embodiment of the present invention, the vanadate component and support is combined in water and a binder, preferably silica, titania, or zirconia. The aqueous mixture, or washcoat, may be provided as a suspension of the support material and vanadate component. Should there be an excess of water, the excess is removed by evaporation; however, it is preferred to carefully meter the amount of water added to the dry components to achieve a slurry of acceptable viscosity for either a washcoat or for extrusion. Generally, a typical range of percent solids in the washcoat is about 20% to about 45%, more preferably about 20% to about 30%. A typical range of percent solids in the extrusion composition is about 65% to about 85%, more preferably about 72% to about 78%. For the purpose of the present specification and claims the term "percent solids" is the weight of dry materials within an aqueous mixture per the total weight of the aqueous mixture.

In a preferred embodiment of the present invention, the washcoat is prepared by combining about 0.5% to about 10% metal containing vanadate, preferably about 0.5% to about 4%; about 50% to about 95% of the support material, preferably about 65% to about 80%; and about 10% to about 50% of the binder, preferably about 15% to about 20%. The previous percentages are based on the total dry weight of the combined components of the washcoat, i.e. prior to the addition of water. In a more preferred embodiment, adding an additional about 3% to about 13% of $WO_3$ to the washcoat formulation has been found to improve the performance of the filter to which the washcoat is applied.

The washcoat may be applied using the methods disclosed in U.S. Pat. No. 6,599,570 and U.S. Patent Publication No. 2011/0268624, the entire contents of which are incorporated herein by reference. It is preferred that the washcoat penetrate the surface of the underlying substrate to a depth of about at least 30 microns, more preferably a depth of about at least 50 microns.

Following application of the washcoat to the filter substrate, the coated filter is dried and calcined to reduce the presence of water and promote adherence of the catalytic composition to the surface of the filter substrate. It has been found that calcining the catalyst following extrusion or application to a filter substrate at temperatures higher than normally employed contributes to the improved thermal stability of the filter incorporating the catalyst. The filter may be exposed to temperatures up to 800° C. without losing significant activity and exhibits greatly improved performance with respect to $NO_X$ conversion at temperatures below 300° C. when compared to prior art filters incorporating vanadate. In a preferred embodiment of the present invention, the catalyst is calcined in air at temperatures in excess of 500 to 700° C. for at least one to ten hours. In a particularly preferred embodiment of the present invention, the catalyst is calcined in air at temperatures of at least 700° C. for at least two to five hours.

The filter after drying and calcining should preferably have a catalyst loading of about 0.5 to 2.4 $g/in^3$. For the purpose of the present specification and claims the term "catalyst loading" is the amount of catalytic composition per unit volume of filter substrate following drying and calcination.

In a preferred embodiment of the invention, the substrate is a wall-flow filter. A wall-flow filter substrate has multiple channels that are approximately parallel to one another and that extend from an inlet face of the substrate to an outlet face of the substrate along an axis of gas flow through the substrate (i.e., the direction of exhaust gas entering and purified gas exiting). Conventional wall-flow filter substrates for diesel engines are typically provided in the form of either a cordierite or silicon carbide honeycomb. The channels are defined by porous walls and each channel has a cap at either the inlet or outlet face of the substrate. The porous walls are also defined by an upstream side and a downstream side, relative to the direction of gas flow through the walls. Wall-flow filter substrates for use in vehicular exhaust systems such as these are commercially available from a variety of sources.

Wall-flow substrates useful in the present invention can have any shape suitable for use in an exhaust system, provided that the substrate has an inlet face, an outlet face, and a length between the inlet and outlet faces. Examples of suitable shapes include circular cylinders, elliptic cylinders, and prisms. In certain preferred embodiments, the inlet face and outlet face are in parallel planes. However, in other embodiments, the inlet and outlet faces are not parallel and the length of the substrate is curved.

The substrate preferably contains a plurality of channels that are approximately parallel to each other. The channels are defined by thin porous walls which preferably have a thickness of about 0.002 to about 0.1 inches, preferably about 0.002 and 0.015 inches. The cross-sectional shape of the channels is not particularly limited and can be, for example, square, circular, oval, rectangular, triangular, hexagonal, or the like. Preferably, the substrate contains about 25 to about 750 channels per square inch, and more preferably about 100 to about 400 channels per square inch.

Wall flow substrates may be constructed of combinations of one or more materials. By "combinations" is meant physical or chemical combinations, e.g., mixtures, compounds, or composites. Some materials that are especially suited to the practice of the present invention are those made of cordierite, mullite, clay, talc, zircon, zirconia, spinel, alumina, silica, borides, lithium aluminosilicates, alumina silica, feldspar, titania, fused silica, nitrides, borides, carbides, e.g., silicon carbide, silicon nitride or mixtures of these. Particularly preferred materials include cordierite, aluminum titanate, and silicon carbide.

Preferably, the substrate is constructed of a material having a porosity of at least about 50%, more preferably about 50-75%, and a mean pore size of at least 10 microns.

Preferably, the SCR catalyst is disposed on the filter. The SCR catalyst may reside in at least a portion of the pores of the wall, more preferably on the surfaces of the pores in the filter wall. It is highly preferred that the catalyst in the pores is disposed in a manner that does not clog the pores, which could overly restrict the flow of exhaust gas through the wall. More than one catalyst may be layered on top of each other in the pores. The catalyst may also be disposed in the wall so as to form one or more concentration gradients between the upstream side and downstream side of the wall. Different catalyst may be loaded on the upstream and corresponding downstream sides of the wall.

As mentioned above, it is highly preferred that the catalyst in the pores is disposed in a manner that does not clog the pores. Clogged pores would increase the pressure drop across the filter and negatively affect the efficiency of the combustion process occurring upstream of the filter. Another embodiment of the invention incorporates a catalyst membrane, similar to the films or coat layers disclosed in U.S. Patent Publication No. 2010/0242424, to address the problems associated with generating unwanted back pressure.

When applying a washcoat to a substrate, the washcoat coats the surface of the pores and after calcination, effectively narrows the pore diameters in the walls of the filter substrate. So that the final pore diameters are not so small as to create excessive pressure drop across the filter, the initial uncoated pore diameters should be large; however, excessive porosity impairs the structural integrity of the filter and may result in the filter cracking during the calcination process. Rather than apply a catalytic composition in the form of a washcoat which penetrates the pores of the substrate, an aqueous catalytic composition may be applied to the surface of the filter, such that upon calcination a thin layer or membrane is formed on the surface and does not penetrate the surface.

The aqueous catalytic composition is prepared in the form of a slurry which includes some pore modifiers. After calcination to remove water from the applied slurry, the resulting membrane should have a porosity that will prevent the passage of particulate matter, preferably less than the porosity of the filter substrate. The porosity of the filter substrate may be proportionately increased to obtain a filter that will exhibit an acceptable pressure drop during use, but not to the extent that the structural integrity of the filter substrate will be compromised.

In a preferred embodiment of the present invention, the SCR wall-flow filter is extruded. Eliminating the substrate allows a filter to contain more catalyst per unit volume. Extruding a catalyst also eliminates the step of producing a washcoat in addition to the steps of applying and drying the washcoat. Therefore, extrusion eliminates the expense associated with the manufacturing processes required for making and applying a washcoat. The wall-flow filter is manufactured by first combining catalytic material, a binder, and inorganic fibers in a suspension. The suspension is provided by mixing the starting materials and processing them by mixing and/or kneading in an acid or alkaline aqueous mixture, adding an organic reagent to form a composition which is suitable for extrusion, extruding the composition into a catalyst body, drying, and calcining said body to form a solid catalyst body.

In a particularly preferred embodiment, the starting material, based on the total weight of dry solids prior to the addition of liquids and organic reagents, comprises about 50% to about 95%, preferably about 75% to about 85%, of the support material, which is preferably about a 4:1 to 99:1 mixture of $TiO_2$ and $WO_3$; about 0.1% to about 10%, preferably about 1% to about 5%, of the metal containing vanadate; about 0% to about 45%, preferably about 5% to about 10%, of at least one binder; and about 0% to about 20%, preferably about 5% to about 10%, of glass fibers. As the glass fibers are added to the mixture separately from the other dry solids, the amount of glass fibers present in the composition for extrusion may be expressed as a weight ratio of dry materials to glass fibers, wherein the weight of dry materials is exclusive of the glass fibers. The ratio of dry materials to glass fibers would therefore preferably be about 6:1 to about 20:1. The starting material may also optionally include about 0.1% to about 5%, preferably about 1%, of a soluble vanadium salt, which has been found to improve the activity of the final filter. Suitable binders for use in the manufacture of the extruded filter include Bentonite Clay, Kaolin, and $SiO_2$. The mixture may also include extrusion additives, such as pore modifiers like starch, flour, coconut fiber, cellulose, and diatomaceous earth.

Upon extruding the composition, the resulting filter will preferably be a honeycomb structure having multiple parallel channels that are open on both ends with adequate porosity to allow gas flow and trap particulate matter. To produce a wall-flow filter, the channels in the extruded filter must be closed on one end. As mentioned above, the extruded filter is finally calcined at temperatures in excess of 500 to 700° C. for at least one to ten hours. In a particularly preferred embodiment of the present invention, the catalyst is calcined in air at temperatures of at least 700° C. for at least two to five hours.

In a typical treatment system, exhaust gas from a lean burn combustion engine flows into the channels of a filter and against the surfaces of each channel. During operation of an engine, a pressure differential exists between the inlet and outlet of the filter (higher pressure at the inlet relative to the outlet), and thus a pressure differential also exists across the wall separating adjacent channels. This pressure differential, along with the gas permeable nature of the walls, allows the exhaust gas that flows into a channel which is open to the inlet, to pass from the upstream side of a porous wall to the downstream side of that wall, and then into an adjacent channel which is open to the outlet of the filter. Particulate matter cannot pass through the porous wall and is trapped within the channels. The catalyst which has been either adhered to the surface of the channels or extruded within the walls of the channels contacts the exhaust gas and reduces the $NO_X$ gases to $N_2$.

The substrate wall has a porosity and pore size that make it gas permeable, but allow it to trap a major portion of the particulate matter, such as soot, from the gas as the gas passes through the wall. Preferred wall-flow substrates are high efficiency filters. Efficiency is determined by the weight percent of particulate matter removed from the untreated exhaust gas upon passing through a wall-flow substrate. Wall flow filters for use with the present invention have an efficiency of least 70%, preferably at least about 75%, more preferably at least about 80%, or most preferably at least about 90%. In certain embodiments, the efficiency will be from about 75 to about 99%, preferably about 75 to about 90%, more preferably about 80 to about 90%, or most preferably about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, preferably 0.1 to 0.25 microns, more preferably 0.25 to 1.25 microns, or most preferably 1.25 to 2.5 microns.

During normal operation of the exhaust system, the soot and other particulates accumulate on the inlet sides of the walls which lead to an increase in backpressure. To alleviate this increase in backpressure, the filter substrates are continuously or periodically regenerated by active or passive techniques including combusting the accumulated soot by known techniques including, for example in the presence of nitrogen dioxide generated from an upstream oxidation catalyst. However, inclusion of an additional component of an exhaust gas treatment system increases the weight and negatively effects the fuel economy of a vehicle incorporating the system. A filter according to the present invention can reduce or eliminate the need for an upstream oxidation catalyst.

In an embodiment of the present invention, a washcoat including a vanadate component is prepared as previously described and applied only to the outlet channels of a substrate in the form of a wall-flow filter. By providing the catalyst on the outlet channels only, NOx present in the exhaust gas is available for passive regeneration within the inlet channels of the wall-flow filter where the soot has collected. Such regenerative traps are known in the art, like for example, the continuously regenerating trap described in U.S. Pat. No. 4,902,487. In another embodiment, the washcoat is applied to both the outlet channels and the inlet channels, but only to the end portion of the wall-flow filter from which the treated exhaust gases exit. "End portion" as used in the specification and the claims refers to the axial section of the filter encompassing the inlet face or outlet face and having a length measured from either the inlet face or outlet face that is preferably about half of the overall length of the filter, more preferably about a third of the overall length, and most preferably about one-fifth of the overall length. This alternative embodiment again delays the reduction of NOx in the exhaust gas, so that it is available to combust soot within the wall-flow filter. In another embodiment of the present invention, a filter is extruded according to the present invention as described above except that the vanadate component, rather than being exclusively incorporated in the extrudate, is primarily applied in the form of a washcoat either to the outlet channels alone or to the end portion of the inlet and outlet channels at the outlet of the filter. The washcoat may be applied to either the inert substrate or an extruded filter using the methods disclosed in U.S. Pat. No. 6,599,570 and U.S. Patent Publication No. 2011/0268624.

As noted above, a filter in which the vanadate component has been selectively applied to a particular region of the substrate provides the benefit of promoting passive regeneration of the wall-flow filter and potentially reduces the size or eliminates the need for an upstream oxidation catalyst. The filter according to the present invention also provides the additional benefit of improved sulfur tolerance associated with vanadates. Improved sulfur tolerance eliminates the need to incorporate some form of upstream treatment of exhaust gas to remove sulfur oxides that may come in contact with the catalyst.

The catalyst used in the present method of producing a filter efficiently reduces the concentration of $NO_X$ gases in an exhaust gas stream and does not lose activity following exposure to excess temperatures over prolonged periods. Accordingly, a filter produced according to the present inventive process is suitable for the treatment of exhaust gas from a lean burn combustion engine, such as a diesel engine.

The reductant (also known as a reducing agent) for SCR processes broadly means any compound that promotes the reduction of $NO_x$ in an exhaust gas. Examples of reductants useful in the present invention include ammonia, hydrazine or any suitable ammonia precursor, such as urea (($NH_2$)$_2CO$), ammonium carbonate, ammonium carbamate, ammonium hydrogen carbonate or ammonium formate, and hydrocarbons such as diesel fuel, and the like. Particularly preferred reductants are nitrogen based, with ammonia being most preferred.

In a system in which urea is used as the reducing agent, a filter according to an embodiment of the present invention is provided that incorporates a hydrolysis catalyst. A hydrolysis catalyst promotes the conversion of urea in the presence of water into carbon dioxide and ammonia. The hydrolysis catalyst is preferably in the form of titania having a particular crystallite size known to promote the hydrolysis of urea or titania having a silicon-doped surface. The titania is incorporated with the binder of a washcoat or composition for extrusion as described above.

It is preferable to incorporate a urea hydrolysis zone in the inlet end portion of a filter to enable the ammonia to form prior to its consumption in the reduction of NOx downstream. In one embodiment of the present invention, the hydrolysis catalyst is incorporated in a washcoat and applied to at least one of the inlet end portion of the filter or to the inlet channels. A second washcoat incorporating a vanadate component as described above is then applied to at least one of the outlet end portion of the filter or to the outlet channels. In another embodiment, the hydrolysis catalyst is incorporated in a composition that is extruded and formed into a wall flow filter. A washcoat containing the vanadate component is then applied to at least one of the outlet end portion of the extruded filter or to the outlet channels.

In another embodiment of the invention, the filter includes a downstream zone to oxidize ammonia unconsumed during the reduction of NOx. Reduction of NOx occurs on the surface of the catalyst where ammonia is also adsorbed. Some ammonia, particularly when an excess of ammonia is present, is not adsorbed and may pass through the filter and exit the exhaust system into the atmosphere, which is known as ammonia slip. To prevent ammonia slip, it is preferred to incorporate materials known to oxidize ammonia within the catalyst. Examples of such materials are known and disclosed in U.S. Pat. No. 8,101,146, the contents of which are incorporated herein by reference. Similar to the techniques described to promote the passive regeneration of the filter, a washcoat containing ammonia oxidation materials may be applied to the outlet channels or to both of the inlet and outlet channels at the outlet end portion of either an inert filter substrate or an extruded substrate.

According to another aspect of the invention, provided is a method for the reduction of $NO_X$ compounds or oxidation of $NH_3$ in a gas, which comprises contacting the gas with a catalyst described herein for a time sufficient to reduce the level of $NO_X$ compounds in the gas. In one embodiment, nitrogen oxides are reduced with the reducing agent at a temperature of at least 150 to 550° C. In a particular embodiment, the temperature range is from 175 to 650° C. In another embodiment, the temperature range is from 175 to 550° C. In yet another embodiment, the temperature range is 250 to 350° C.

The method can be performed on a gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

According to a further aspect, the invention provides an exhaust system for a vehicular lean burn internal combustion engine, which system comprises a conduit for carrying a flowing exhaust gas, a source of nitrogenous reductant, and a catalyst incorporating a vanadate component as described herein. The system can include a controller for metering of nitrogenous reductant into the flowing exhaust gas only when it is determined that the catalyst is capable of catalyzing $NO_x$ reduction at or above a desired efficiency, such as at temperatures above 100° C., above 150° C. or above 175° C. This determination can be assisted by one or more suitable sensor inputs indicative of a condition of the engine selected from the group consisting of: exhaust gas temperature, catalyst bed temperature, accelerator position, mass flow of exhaust gas in the system, manifold vacuum, ignition timing, engine speed, lambda value of the exhaust gas, the quantity of fuel injected in the engine, the position of the exhaust gas recirculation (EGR) valve and thereby the amount of EGR and boost pressure.

In a particular embodiment, metering is controlled in response to the quantity of nitrogen oxides in the exhaust gas determined either directly (using a suitable $NO_X$ sensor) or indirectly, such as using pre-correlated look-up tables or maps—stored in the control means—correlating any one or more of the abovementioned inputs indicative of a condition of the engine with predicted $NO_X$ content of the exhaust gas. The metering of the nitrogenous reductant can be arranged such that 60% to 200% of theoretical ammonia is present in exhaust gas entering the SCR catalyst calculated at 1:1 $NH_3/NO$ and 4:3 $NH_3/NO_2$. The control means can comprise a pre-programmed processor such as an electronic control unit (ECU).

In a further aspect, there is provided an exhaust system according to the present invention for treating gases from a vehicular lean-burn combustion engine. The vehicular lean burn internal combustion engine can be a diesel engine, a lean-burn gasoline engine or an engine powered by liquid petroleum gas or natural gas. As seen in FIG. 1, a lean burn combustion engine (1) is shown and has a conduit (2) to carry an exhaust gas stream from the lean burn combustion engine (1) to the filter (3) retained within a metal can or canister (4). The filter (3), made according to the present invention, is a wall-flow filter incorporating the vanadate component having an alkaline earth metal, a transition metal, a rare earth metal, or combinations thereof. Mounted close and upstream to the filter (3) is an injection point from a reductant source (5) that is filled with a reductant, such as ammonia or urea. The gas stream (6) exiting the metal can (4) is treated, such that the concentration of NOx gases and particulate matter has been reduced.

EXAMPLES

By way of example, the following are two embodiments of a preferred method for producing a composition that may be extruded and calcined into a filter according to the present invention:

Example 1

A mixture of dry materials including organic reagents, iron vanadate (FeVO$_4$), TiO$_2$, WO$_3$, and binders were charged into a kneading vessel in amounts according to Table 1.

TABLE 1

| Component | Mass (g) |
|---|---|
| TiO$_2$ | 2208.32 |
| WO$_3$ | 245.37 |
| FeVO$_4$ | 115.94 |
| Bentonite Clay | 100.00 |
| Kaolin | 91.93 |
| Precipitated Silica | 42.00 |
| Hydroxyethyl Cellulose | 36.00 |
| Polyethylene oxide | 30.00 |

While mixing at a constant temperature of 29° C. and maintaining the contents of the vessel at a pH from about 4.0 to 8.0, water was added until the moisture content of the aqueous mixture was approximately 20%. Upon reaching the specified moisture content, about 240 grams of 4.5 mm e-glass fibers having a 6 μm diameter were charged into the vessel. After addition of the glass fibers, additional water and about 15 grams of a plasticizer was added until the moisture content of the composition was about 24%. The composition was kneaded until the composition was suitable for extrusion.

Example 2

A mixture of dry materials including organic reagents, ammonium metavanadate (AMV), FeVO$_4$, TiO$_2$, WO$_3$, and binders were charged into a kneading vessel in amounts according to Table 2.

TABLE 2

| Component | Mass (g) |
|---|---|
| TiO$_2$ | 2231.25 |
| WO$_3$ | 247.92 |
| FeVO$_4$ | 46.88 |
| AMV | 32.69 |
| Bentonite Clay | 104.33 |
| Kaolin | 95.91 |
| Precipitated Silica | 45.90 |
| Hydroxyethyl Cellulose | 36.00 |
| Polyethylene oxide | 30.00 |

While mixing at a constant temperature of 29° C. and maintaining the contents of the vessel at a pH from about 8.9, water and 150 grams of ammonia was added until the moisture content of the aqueous mixture was approximately 23.4%. About 25.8 grams of monoethanolamine (MEA) was also added to assist with the solubilizing of the AMV. Upon reaching the appropriate moisture content, about 245 grams of 4.5 mm e-glass fibers having a 6 μm diameter were charged into the vessel. After addition of the glass fibers, additional water, 12 grams of lactic acid, and about 18 grams of a plasticizer was added until the moisture content of the composition reached about 26.5%. The composition was kneaded until the composition was suitable for extrusion.

By way of example, the following is an embodiment of a preferred method for producing a washcoat that may be applied and calcined onto a filter according to the present invention:

Example 3

A mixture of dry materials including iron vanadate (FeVO$_4$), TiO$_2$, WO$_3$, and binder was combined in amounts according to Table 3.

TABLE 3

| Component | Mass (g) |
|---|---|
| TiO$_2$ | 1435.5 |
| WO$_3$ | 159.5 |
| FeVO$_4$ | 107.0 |
| Colloidal Silica | 975.0 |

The dry materials were combined with 1885 g of water in a vessel and the pH of the aqueous mixture was adjusted to about 7.5 using an ammonia solution. The viscosity of the mixture was also adjusted by adding xanthan gum. Additional water was added, such that the final percent solids of the mixture was about 35% and the final xanthan gum content of the mixture was 0.3%. The resulting mixture was suitable for use as a washcoat.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed:

1. A filter comprising:
a substrate in the form of a wall-flow filter, wherein said substrate has an inlet end portion and an outlet end portion and said substrate is comprised of a plurality of inlet channels and a plurality of outlet channels, and a catalyst disposed on said substrate, said catalyst comprising a support and a vanadate component, said vanadate component having a structure defined by the following formula:

$$(A_x)(T_y)(R_z)VO_4$$

wherein "A" is an alkaline earth metal and "X" is the molar ratio of the alkaline earth metal to vanadate;
"T" is a metal and "Y" is the molar ratio of the metal to vanadate;
"R" is a rare earth metal and "Z" is the molar ratio of the rare earth metal to vanadate; and
$0 \leq X \leq 1$; $0 \leq Y \leq 1$; $0 \leq Z \leq 1$; and $X+Y+Z=1$; and
wherein said vanadate component is disposed on the substrate in the form of a washcoat to the inlet end portion and the outlet end portion of the channels of the filter, where the inlet end portion and the outlet end portion of the channels is the axial section of the filter encompassing an inlet face or an outlet face and having a length measured from either the inlet face or outlet face that is about half of the overall length of the filter,
wherein "A" is selected from the group consisting of Mg, Ca, Sr, and Ba, "T" is selected from the group consisting of Fe, Cu, Zn, Mo, Cr, and Mn, and "Z" is 0;
wherein the substrate is constructed of a material having a porosity of at least about 50% and a mean pore size of at least 10 microns and the substrate has an efficiency of at least 70% for particles in the range of 0.05 microns to 2.5 microns, and wherein said catalyst is disposed on the surface of the pores of the filter.
2. The filter of claim 1, wherein "T" is Fe.

3. The filter of claim 1, wherein said support comprises a material selected from the group consisting of at least one of $TiO_2$, $WO_2$ and $SiO_2$.

4. The filter of claim 1, further comprising a urea hydrolysis catalyst disposed on the inlet end portion of said substrate.

5. The filter of claim 1, further comprising an ammonia oxidation catalyst disposed on the outlet end portion of said substrate.

6. An exhaust system for treating exhaust gases from an engine, the exhaust system comprising:
  a. a filter according to claim 1 disposed downstream from the engine;
  b. a source of ammonia or urea upstream of said filter; and
  c. an exhaust gas conduit for carrying the exhaust gases from the engine to said filter.

7. The filter of claim 1, wherein the length measured from either the inlet face or outlet face is about a third of the overall length of the filter.

8. The filter of claim 1, wherein the length measured from either the inlet face or outlet face is about one-fifth of the overall length.

9. The filter of claim 2, wherein "Y" is 1.

10. The filter of claim 2, wherein $0<X<1$; $0<Y<1$.

11. A system comprising:
  a. an engine;
  b. a filter according to claim 1 disposed downstream from the engine;
  c. a source of ammonia or urea upstream of the filter; and
  d. an exhaust gas conduit for carrying an exhaust gas from said engine to said filter.

* * * * *